(12) United States Patent
Nasiby et al.

(10) Patent No.: US 8,271,723 B1
(45) Date of Patent: Sep. 18, 2012

(54) ISOLATION DEVICES FOR HIGH PERFORMANCE SOLID STATE DRIVES

(75) Inventors: Omid Nasiby, Santa Ana, CA (US); Stephen R. Boorman, Santa Ana, CA (US); Irfan Syed, Santa Ana, CA (US)

(73) Assignee: STEC, Inc., Santa Ana, CA (US)

( * ) Notice: Subject to any disclaimer, the term of this patent is extended or adjusted under 35 U.S.C. 154(b) by 0 days.

(21) Appl. No.: 13/407,095

(22) Filed: Feb. 28, 2012

Related U.S. Application Data

(60) Provisional application No. 61/449,506, filed on Mar. 4, 2011.

(51) Int. Cl.
*G06F 12/00* (2006.01)
(52) U.S. Cl. ........................................................ 711/103
(58) Field of Classification Search .................. None
See application file for complete search history.

(56) References Cited

U.S. PATENT DOCUMENTS

| | | | | |
|---|---|---|---|---|
| 5,592,641 | A * | 1/1997 | Fandrich et al. | 711/103 |
| 6,483,742 | B1 * | 11/2002 | Sweha et al. | 365/185.03 |
| 6,574,159 | B2 * | 6/2003 | Ohbayashi et al. | 365/201 |
| 7,107,480 | B1 * | 9/2006 | Moshayedi et al. | 714/2 |

OTHER PUBLICATIONS

No Author Listed. "Quickswitch Products High-Speed CMOS Quickswitch 8-bit Bus Switch." Industrial Temperature Range. Integrated Device Technology, Inc. Oct. 2008. 5 pages.

* cited by examiner

*Primary Examiner* — Brian Peugh
(74) *Attorney, Agent, or Firm* — Wilmer Cutler Pickering Hale and Dorr LLP

(57) ABSTRACT

Systems and methods are provided for coupling multiple flash devices to a shared bus utilizing isolation switches within a SSD device. The SSD device is operable at a speed of about 400 MT/s or higher with high signal integrity. The SSD device includes a controller, a channel in electrical communication with the controller, a plurality of isolation devices in electrical communication with channel, and a plurality of flash memory devices, wherein each flash memory device is in electrical communication with the channel and controller through the one of the isolation devices.

20 Claims, 8 Drawing Sheets

ISOLATION DEVICES FOR HIGH PERFORMANCE SOLID STATE DRIVES

CROSS-REFERENCE TO RELATED APPLICATION

This application claims benefit under 35 U.S.C. §119(e) of U.S. Provisional Patent Application No. 61/449,506, entitled "LOAD ISOLATION FOR HIGH PERFORMANCE SOLID STATE DEVICES," filed on Mar. 4, 2011, which is expressly incorporated herein by reference in its entirety.

TECHNICAL FIELD

The disclosed subject matter relates generally to load isolation for high performance solid state devices.

BACKGROUND

FIG. 1 depicts a block diagram of a multi-channel solid state drive (SSD) device 100. A typical multi-channel SSD device 100 includes a SSD controller 102, external (or internal) buffers 104, a host interconnect 105, a plurality of channels 107, 109, 111, 113 and 115, and flash memory devices 108, 110, 112, 114, and 117, each of which is connected to each of channels 107, 109, 111, 113, and 115, respectively. SSD controller 102 includes a host interface 116, a processor 118, and a flash controller 120. Host interface 116 connects SSD controller 102 to an external host through host interconnect 105. Processor 118 controls the operation of each component of SSD controller 102. Flash controller 120 controls communication between SSD controller 102 and each of the flash memory devices 108, 110, 112, 114 and 116, over channels 107, 109, 111, 113, and 115. Each flash memory device includes one or more circuit dies that are contained within a package.

FIG. 2 depicts a single-channel SSD device 200. Single-channel SSD device 200 has the same SSD controller 102 as multi-channel SSD device 100 shown in FIG. 1. However, instead of having a plurality of channels, single-channel SSD device 200 has one channel 210 that connects each of the flash memory devices 108, 110, 112, 114, and 116 to flash controller 120. Each flash memory device 108, 110, 112, 114, and 116 includes one or more circuit dies (shown as three dies in FIG. 2) that are contained within a package.

The number of channels in an SSD device is determined by a capacity target and/or power consumption of the controller. An important design consideration for such controllers is the number of channels. Controllers often use many channels to satisfy the throughput requirement and to connect as many flash devices as needed to reach the target drive capacity. The embodiments of FIGS. 1 and 2 are amenable to prior flash interface speeds, which are around 40 MT/s to 166 MT/s (million transfers per second). MT/s is a measurement of channel speed in millions of effective cycles per second. It is a rate at which the data is actually transferred, as opposed to the frequency of the clock that drives the flash interface.

In the past few years, flash interface speed has increased from 40 MT/s to about 400 MT/s (+/-10%.) Furthermore, interface speeds are expected to exceed 400 MT/s in next few years. In addition to speed increases, the size increase of SSDs (i.e., the number of flash memory devices and dies increases) also causes the performance of the current SSD device to deteriorate. For example, in a shared channel SSD, several flash devices share the same control and data channel to communicate with the controller. This means the load on the channel increases as the number of flash devices increase. The situation worsens as the number of dies within each flash device or the number of flash memory devices increases. This increase in the number of dies results in higher capacitive load per flash memory device. As an example, Table 1 shows the load for different packages that include two dies (dual die package (DDP)), four dies (quad die package (QDP)), and eight dies (octa die package (ODP)).

TABLE 1

Capacitive load of a flash device with multiple die in package

| Dual Channel DDP | Dual Channel QDP | Dual Channel ODP |
| --- | --- | --- |
| 8 picofarads | 13 picofarads | 23 picofarads |

Driving large capacitive loads is an issue for both the SSD controller and flash devices. When designing a SSD controller, one could design or use an input/output (I/O) with a higher capacitance drive capability. However, such a design would impact the flash side limiting the device to 16 flash dies per channel, for example. As the number of flash memory devices increases, the capacitive load on the channel increases. This in turn causes the signal quality to decrease. For example, FIG. 3 depicts a Data Eye Diagram (DQ) at 200 MHz operation for a 32-die shared channel device with output state logic power voltage (VCCQ) of 3.3V. Specifically, FIG. 3 shows the signal quality when a flash memory device sends data to a controller in a 32-die shared channel environment. As shown, the data eye window is not recognizable. Therefore, the SSD controller cannot latch the incoming data from flash. Thus, at 200 MT/s, a 32-die shared channel device is unworkable using current techniques.

SUMMARY

Certain embodiments of the disclosed subject matter allow more flash devices to share the same bus within an SSD device with high signal integrity, and yet providing support for future capacity extension. The present disclosure presents an SSD device with a flash communication interface that can support flash memory devices operating at a speed of about or greater than 400 MT/s with high signal integrity. In some aspects, the SSD device is designed to be operable at the speed of about 400 MT/s to 1 GT/s In one aspect, the disclosed subject matter relates to a SSD device including a controller, a channel in electrical communication with the controller, a plurality of isolation devices in electrical communication with the channel, and a plurality of flash memory devices, wherein each flash memory device is in electrical communication with the channel and controller through the one of the isolation devices. In some embodiments, the isolation device can be a switch. In some embodiments, the switch can be a field effect transistor. In some embodiments, the switch can be a plurality of field effect transistors. In some embodiments, the switch can be a one-to-two field effect transistor switch or a one-to-four field effect transistor switch. In some aspects, the SSD controller is implemented as an Application Specific Integrated Circuit (ASIC) controller.

In some embodiments, an isolation device is used to isolate one or more flash memory devices from the controller in response to an exception condition. The exception condition can include a power disruption or interruption, and/or a receipt of an exception signal from another device. In one aspect, the controller can determine or detect the exception condition and provide an output enable signal to disable the isolation device. In some embodiments, the isolation device can be disabled by decoupling the isolation device from a power supply. When the output enable signal transitions from an active state to an inactive or disconnect state, there is no electrical connectivity through the isolation device. In other words, the flash devices are decoupled from the controller if the output enable signal is at an inactive or disconnected state.

In certain aspects, the controller is configured to send a flash control data signal, a select command signal, and an output enable signal to the isolation device. Upon determining that the exception condition has occurred, the controller causes the output enable signal to transition from a first state to a second state. In some embodiments, when the output enable is in the second state, one or more flash memory devices are isolated from the controller and ceased from receiving further input from the flash control data signal. In some embodiments, the isolation device may be a buffer. In some embodiments, the device may include a plurality of channels, where each channel is in electrical communication with a plurality of isolation devices and a plurality of flash memory devices. In some embodiments, one of the flash memory devices is in electrical communication with the channel and the controller through a plurality of isolation devices. In some embodiments, the solid state device includes a plurality of secondary isolation devices located between the plurality of isolation devices and the plurality of flash memory devices.

In some embodiments, the solid state device includes a plurality of tertiary isolation devices located between the plurality of secondary isolation devices and the flash memory devices. In some embodiments, the solid state device includes a plurality of channels. In some embodiments, each flash memory device can include a plurality of dies. In some embodiments, the solid state device can include a die isolation device between the flash memory device and each of the dies. In one aspect, the disclosed subject matter relates to a circuit including a flash controller having an input and an output, a multiplexing circuit with an input connected to the output of the flash controller, said multiplexing circuit having a plurality of outputs, each of which is for connecting to a different one of a plurality of flash memory devices, wherein the multiplexing circuit during operation electrically connects the input of the multiplexing circuit to a selectable one the plurality of outputs in response to a control signal provided by the flash controller; wherein the multiplexer circuit can be a plurality of switches. In one aspect, the multiplexing circuit can include an isolation device.

DESCRIPTION

The disclosed subject matter relates to a single or multiple shared channel SSD with isolation devices. An isolation device can isolate flash memory devices and/or memory dies from each other such that the flash controller only sees one flash memory device at a time. An isolation device can be configured so that a flash memory device does not see other flash memory devices that share the same channel. This isolation technique can reduce capacitive load to the flash memory device controller and/or the flash memory devices, thereby improving the performance of SSDs in terms of speed and drive capacity.

The isolation technique is particularly useful when it is used with application specific integrated circuit (ASIC) controllers. The design for ASIC controllers is often fully customized. It therefore has smaller form factor as compared to other type of controllers. In other words, an ASIC controller often has limited number of I/O ports because extra or excess I/O ports can consume additional die area and increase the size of packages as well as the printed circuit board. In addition, extra ports consume additional power regardless of its operational state. For these and other reasons, traditional ASIC controllers are designed according to tailored specifications and thus, have limited room to accommodate additional flash memory devices later on. These limitations associated with ASIC controllers can be mitigated using the disclosed isolation technique. For example, an already-designed ASIC controller with a limited number of I/O ports can interface with multiple flash memory devices using load isolation. The disclosed isolation technique does not depend on how the ASIC controller is designed. In addition, the disclosed isolation technique allows an ASIC controller to interface with more flash memory devices than in previous designs. As will be discussed, a number of flash memory devices can be coupled to a single channel (for example I/O port) using one or more isolation devices. Therefore, high performance SSDs can be manufactured using load isolation. The isolation device can be a switch, for example a FET, or a buffer. The disclosed SSD permits an increase in capacity without affecting performance and power consumption. This is different from existing designs, where each flash memory device has a dedicated channel and a corresponding dedicated I/O port on the controller.

Figure 1:
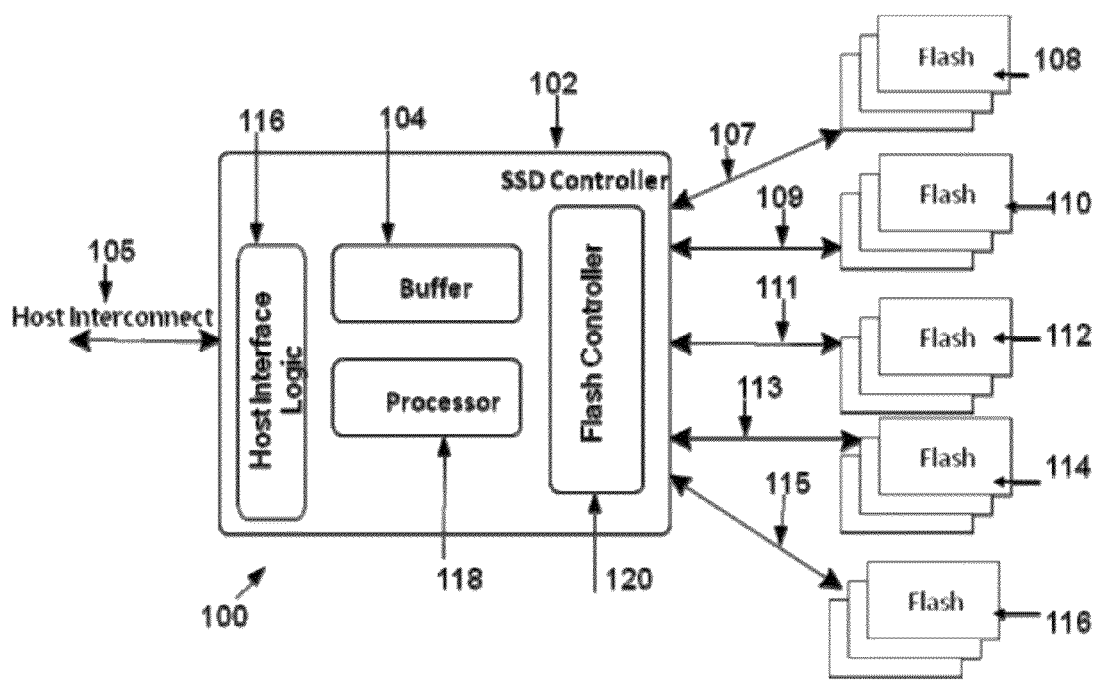
FIG. 1 depicts a block diagram of a Multi-Channel SSD device.
Figure 2:
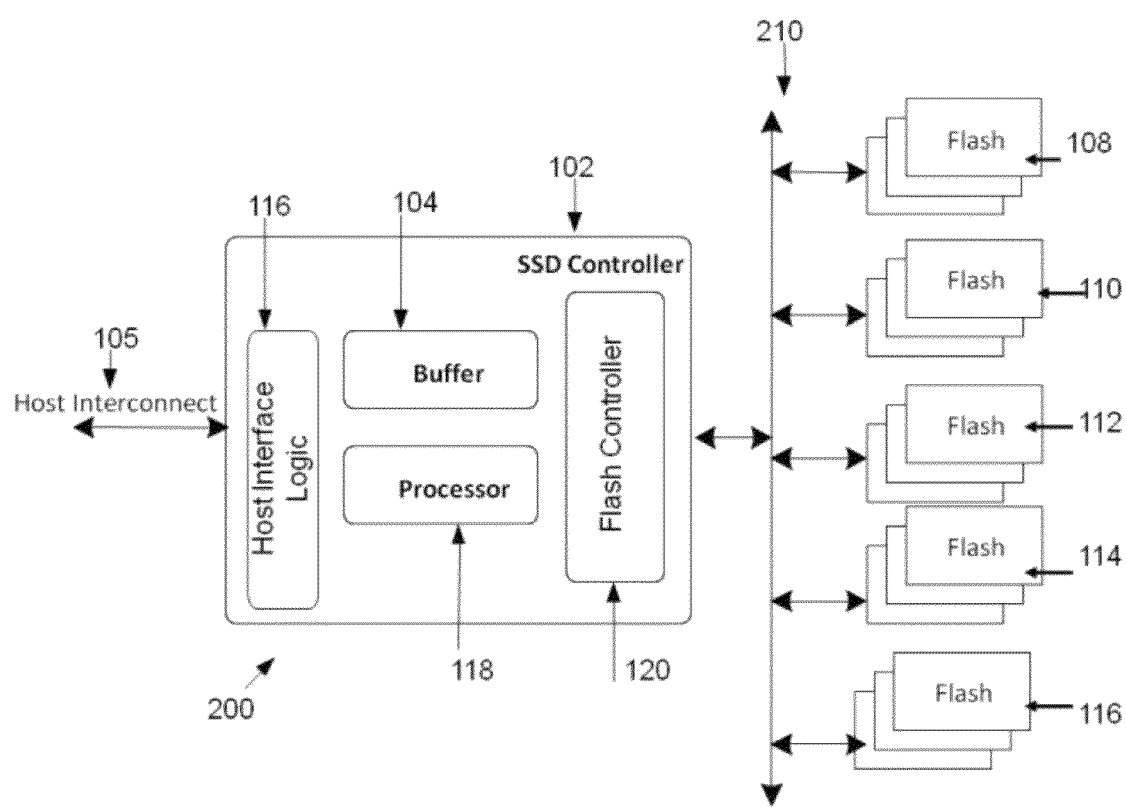
FIG. 2 depicts a single channel SSD device.
Figure 3:
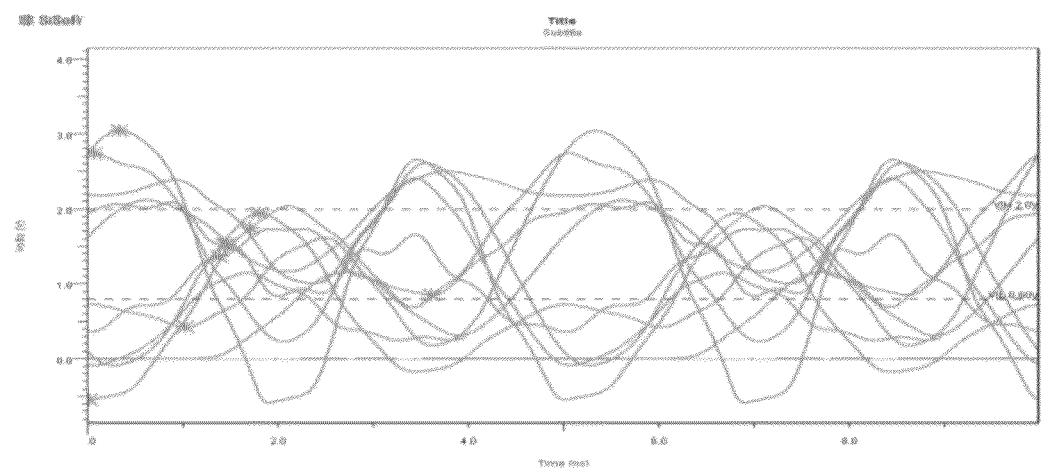
FIG. 3 depicts a Data Eye Diagram (DQ) of a signal on an SSD operating at 200 MHz operation; VCCQ of 3.3V.
Figure 4:
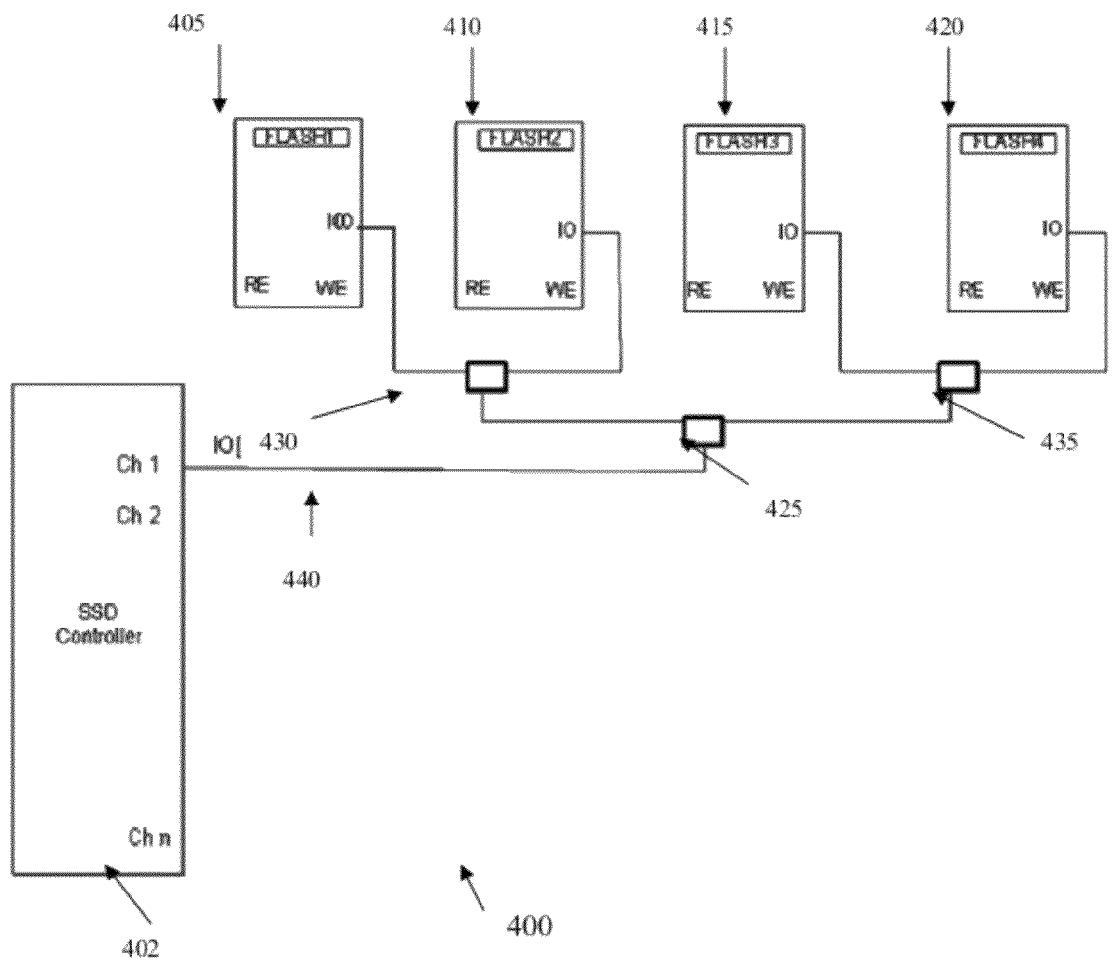
FIG. 4 depicts a block diagram of a single-channel SSD using isolation devices in a physical channel according to certain embodiments of the disclosed subject matter.

These isolation devices can be used in SSDs using a shared channel. FIG. 4 illustrates a block diagram of a multi-channel SSD using isolation devices in a physical channel, according to various embodiments of the disclosed subject matter. Because each flash memory device communicates with the controller 402 over a single channel 440 at a rate of about 400 MT/s or higher, a simultaneous operation of all flash memory devices is impracticable. While simultaneous transmission is possible, it is not desirable because of, for example, high power consumption and large channel requirements. FIG. 4 illustrates how isolation devices can be employed in a SSD device to reduce the load seen by the SSD controller and each flash memory device. Specifically, SSD device 400 can include a controller 402 that is electrically coupled to a first flash memory device 405, a second flash memory device 410, a third flash memory device 415, and a fourth flash memory device 420 through a single channel 440. These flash memory devices can be designed to operate at a fast speed. Furthermore, the flash memory devices can be fabricated using advanced fabrication processes with small footprints, for example, 32 nm process, a 22 nm process, or lower.

SSD device 400 also includes three isolation devices, a first isolation device 425, a second isolation device 430, and a third isolation device 435. By using these isolation devices, the flash controller or the selected flash memory device can see the load of only one device (either the selected memory or the flash controller) that is selected and connected to the other end of the channel 440. For example, if controller 402 selects first flash memory device 405 by triggering the first isolation device 425 and second isolation device 430, controller 402 will only see first flash memory device 405 and will not see the loads produced by any other flash memory devices (i.e., second flash memory device 410, third flash memory device 415 and fourth flash memory device 420.) Similarly, first flash memory device 405 will only see controller 402 and not the loads produced by second flash memory device 410, third flash memory device 415 and fourth flash memory device 420. Thus, the loads produced by second flash memory device 410, third flash memory device 415 and fourth flash memory device 420 are completely disconnected from the shared bus and the load of that device will be hidden to either of the other two active ends. The arrangement of the isolation devices in SSD device 400 provides low propagation delay and low data I/O capacitance. Low data I/O capacitance is desirable because it can reduce capacitive loading and signal distortion associated with the data channel. Isolation devices 425, 430, and 435 are coupled to one another via a channel. The channel can be an electrical channel.

Figure 5:
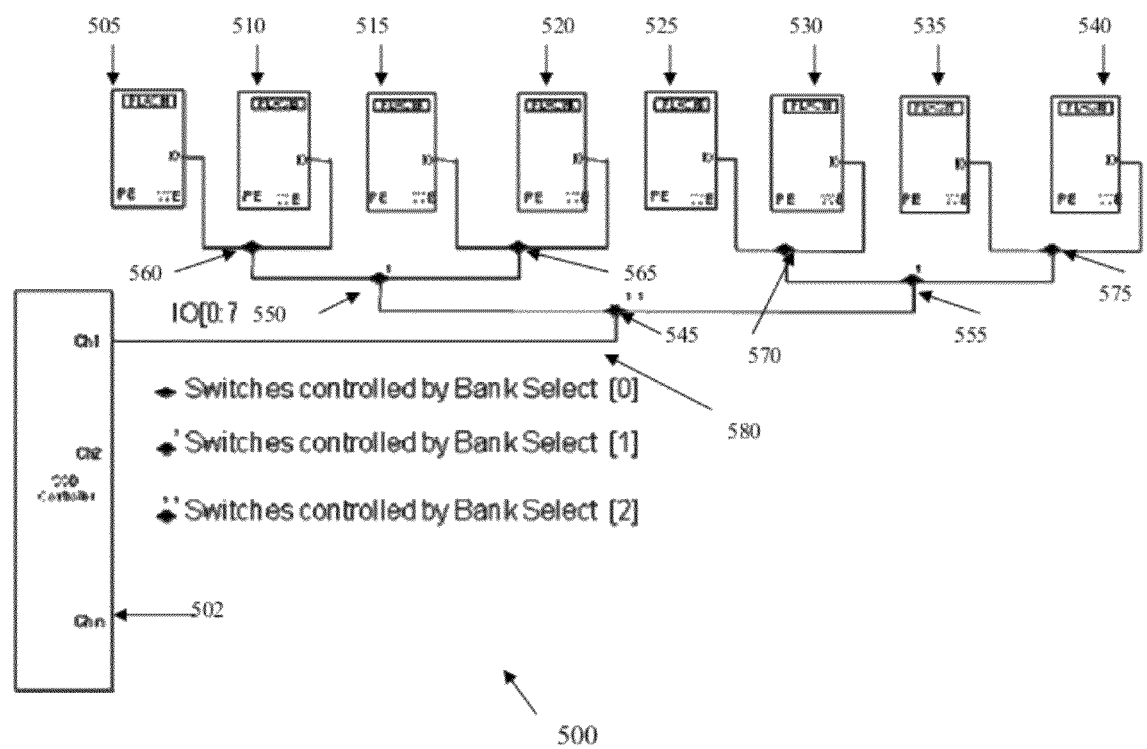
FIG. 5 depicts a block diagram of a single-channel SSD using isolation devices in a physical channel, where the use of switches doubles the capacity without affecting the performance according to embodiments of the disclosed subject matter.

Controller 402 includes logic for selecting any one of the flash memory devices or dies through activation or selection of the corresponding isolation device or devices. Adding one or more additional isolation devices can allow for a deeper level of load isolation. Deeper load isolation can give scalability for capacity extension. FIG. 5 depicts a block diagram of an SSD device 500 using isolation devices in a single physical channel, where the use of tiered load isolation devices doubles the capacity without affecting the performance, according to embodiments of the disclosed subject matter. FIG. 5 shows how the number of flash devices that share the same channel can be doubled without compromise on performance. SSD device 500 includes a controller 502 connected to eight flash memory devices through a single channel 580: a first flash memory device 505, a second flash memory device 510, a third flash memory device 515, a fourth flash memory device 520, a fifth flash memory device 525, a sixth flash memory device 530, a seventh flash memory device 535, and an eighth flash memory device 540. Controller 502 connects to the eight flash memory devices 505-540 through seven isolation devices: a first isolation device 545, a second isolation device 550, a third isolation device 555, a fourth isolation device 560, a fifth isolation device 565, a sixth isolation device 570, and a seventh isolation device 575. Therefore, when controller 502 requests or sends information to fifth flash memory device 525, controller 502 selects first, third and sixth isolation devices (545, 555, and 570) and only sees fifth flash memory device 525 and not the other seven flash memory devices connected on the single channel.

In one embodiment, the isolation device can be a switch or an array of switches. For example, the switch or array of switches can be FET. The FET can include an N-channel FET with low resistance when turned on and high impedance when turned off. While FET switches are used in certain embodiments, any other type of switches or buffers that has a low propagation delay and does not degrade signal quality can also be used. In some embodiments, the FET switches can be configured as a de-multiplexer to connect one input to one of a plurality of outputs and vice versa as a multiplexer.

Figure 6:
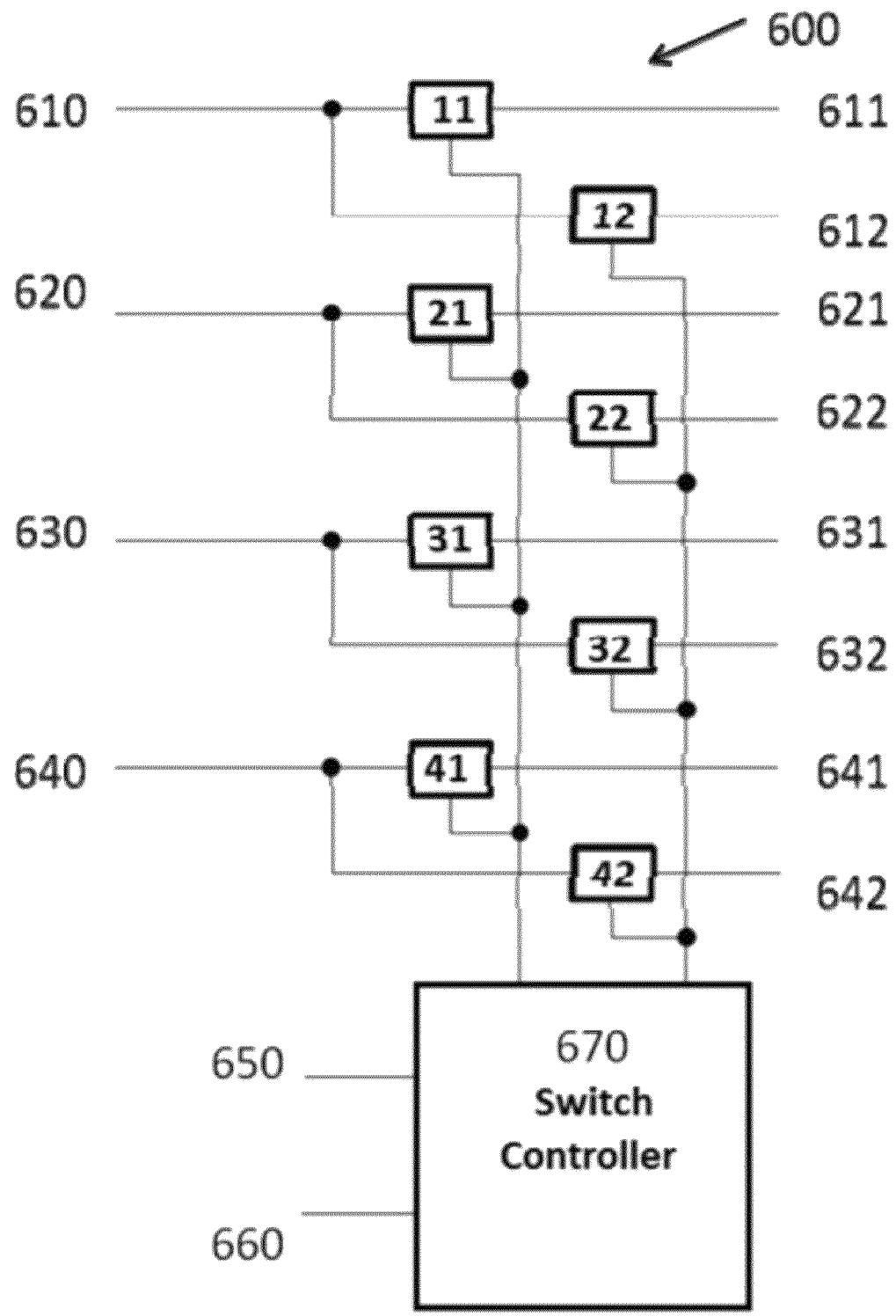
FIG. 6 depicts a functional diagram of a 4 bit 1 to 2 Field Effect Transistor (FET) switch according to embodiments of the disclosed subject matter.

FIG. 6 depicts a functional diagram of a four-bit 1 to 2 switch that is used as an isolation device 600 in accordance to certain aspects of the disclosed subject matter. As will be described in further details below, isolation device 600 includes a four-bit channel with four data bit lines 610, 620, 630, and 640 that carry the first, second, third, and fourth bit, respectively, of a flash control data signal. Each data bit line is coupled (or for example, electrically connected) to two switches. Switches 11 and 12 are coupled to data bit line 610. Switches 21 and 22 are coupled to bit line 620. Switches 31 and 32 are coupled to bit line 630, and switches 41 and 42 are coupled to bit line 640. In one embodiment, switch 11 can include a FET switch, which can regulate the flow of input from data bit line 610 to the flash 1 data bit1 611. Similarly, switch 12 can include a FET switch that regulates the flow of input from data bit line 610 to the flash 2 data bit1 612. In this arrangement, the signal input from one flash control data signal can be de-multiplexed to one of two flash memory devices. The signal input going to the different data bits of each respective flash memory device (611, 621, 631, and 641 of Flash1, and 612, 622, 632, and 642 of flash2) is controlled by switch controller 670 and switches 11, 12, 21, 22, 31, 32, 41, and 42. The ability to select one of many flash memory devices is made possible by the select command signal 650, which will be discussed in further detail. Referring back to FIG. 4, while SSD device 400 uses a 1 to 2 FET switch (e.g., 430,) a higher output multiplexer/de-multiplexer such as 1 to 4 FET switch can also be used to further increase the number of flash memory devices controlled by one flash controller.

In certain existing or commercially available designs, electrostatic discharge (ESD) protected ports can be used to protect flash memory devices that are connected to SSD controllers. ESD can arise from a number of reasons and come from various sources. For example, ESD problems can occur when the controllers are used in abnormal operating conditions, being handled inappropriately, or the controllers are designed on poor printed circuit boards. While ESD protected ports are frequently used to overcome ESD problems, the overall design and size of a SSD device can increase because of the presence of the ESD protection circuits that are associated with ESD protected ports. In addition, ESD protection circuits draw power and cause a greater overall power demand by the SSD device. The use of ESD protected ports therefore may impede the trend of attaining smaller size and densely packed circuit boards.

The trend in the industry is to create smaller and higher density printed circuit boards, smaller I/O ports, line width, and channels. Thus, ESD protection circuits for I/O ports may not be provided in some instances. In addition, the changes in the I/O ports design alone increase the susceptibility of the printed circuits to ESD damage because the tolerable current of the printed circuit board components can be reduced. To overcome these issues, isolation device 600 may be used to protect flash memory devices from ESD damage in lieu of using ESD protected ports.

Referring again to FIG. 6, in some embodiments, an output enable 660 can be provided by the flash controller 120. Table 2 below shows an example of a function table of the output enable 660 and the select command signal 650.

TABLE 2

Function Table

| Select (650) | Output Enable (660) | Function |
|---|---|---|
| L | L | Input signal to Flash 1 |
| H | L | Input signal to Flash 2 |
| X | H | Disconnect |

In some embodiments, output enable signal 660 is set to active (i.e., LOW or "L") in normal operating conditions. However, when flash controller 120 detects an exception condition, the flash controller 120 can cause the output enable signal 660 to transition to a disable state (i.e., HIGH or "H"). The exception condition can include any one or more of power interruption, disturbance, power-off conditions, and power surge from a power regulator (not shown). In some embodiments, the flash controller 120 can determine the exception condition by analyzing input signals. In other embodiments, the flash controller 120 can receive an indication of the exception condition from other devices. For example, the flash controller 120 can receive an indication from a power regulator that the power supply has been disrupted. When the output enable 660 signal is at a disable state, isolation device 600 can be electrically disconnected from SSD controller 102 thereby isolating the flash memory devices. This way, the flash memory devices can be shielded from any power irregularities (e.g., power surge) coming from SDD controller 102.

Figure 8:
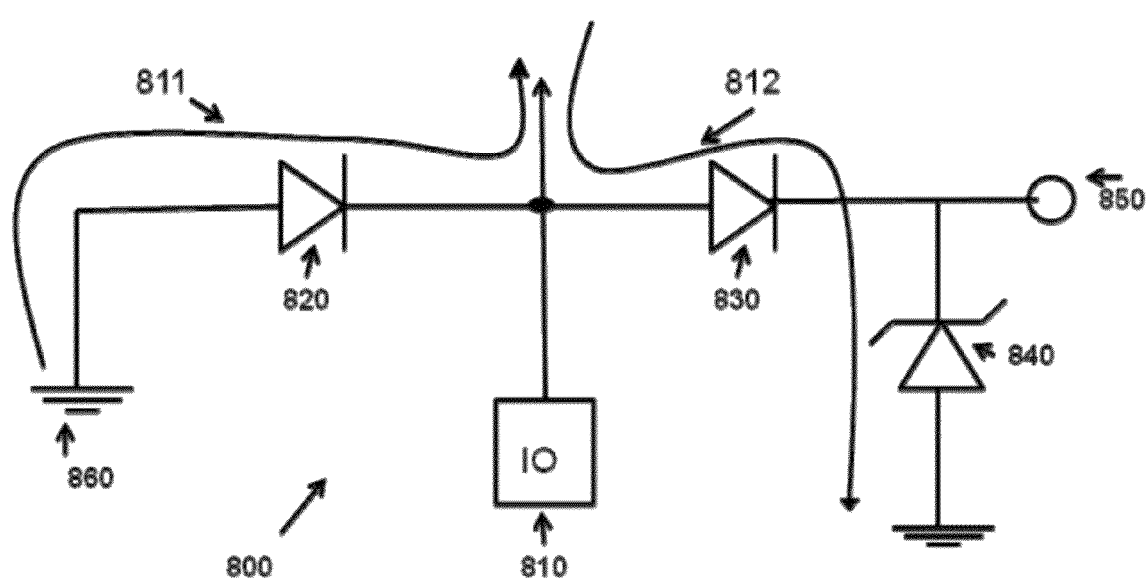
FIG. 8 depicts a diagram of a SSD I/O port with an electrostatic discharge (ESD) protection circuit.

In some embodiments, isolation device 600 can include an ESD protected port to further protect flash memory devices from power glitches that are caused by power cut-off. FIG. 8 illustrates a diagram of a typical ESD protected port 800. Clamping or ESD diodes 820 and 830 are provided on each supply rail going to and from the I/O port 810 (e.g., from I/O port 810 to ground 860 and from I/O port 810 to power supply 850.) ESD protected circuit prevents damage to I/O port 810 by routing ESD pulses away and thereby removing supply voltage from the port. Positive ESD pulses 812 are clamped to the positive supply rail and routed to a zener diode 840, and negative ESD pulses 811 are clamped to ground. However, at the moment that the I/O port supply voltage is cut off in the event of negative ESD event, for example, the diode will forward bias and then drag the I/O port 810 down to near ground. For negative true flash signals such as chip enable, read enable, and write enable, for example (CEn, REn and WEn) this will drive them to the active state and can interrupt the flash operation. The use of the FET switch isolates flash memory devices from the asserted CEn, REn and WEn signals.

This capability of disengaging flash memory devices from such signal irregularities is even more crucial in flash memory devices with power backed up by a reserve power source, such as tantalum capacitors, for example. In these types of flash memory devices, it is expected that any page write operation that is already in place will continue before the power completely fails. As a result, without the protection of isolation device 600 a power glitch may propagate through and change the flash control signals to an active state and disturb the last write.

In some embodiments, the isolation devices are arranged in a tree topology in which each isolation device is electrically coupled to one another via electrical channels. In other words, the isolation devices are arranged as nodes in the tree topology, and the electrical channels are arranged as edges in the tree topology. The tree topology can include channel branches that electrically couple two or more isolation devices. The tree topology can include a binary tree topology, as illustrated in FIGS. 4 and 5. The tree topology can also include a skewed tree topology. The tree topology can be selected based on the number of flash memory devices, the differences in flash memory device capacities, and/or flash memory device access pattern.

Figure 7:
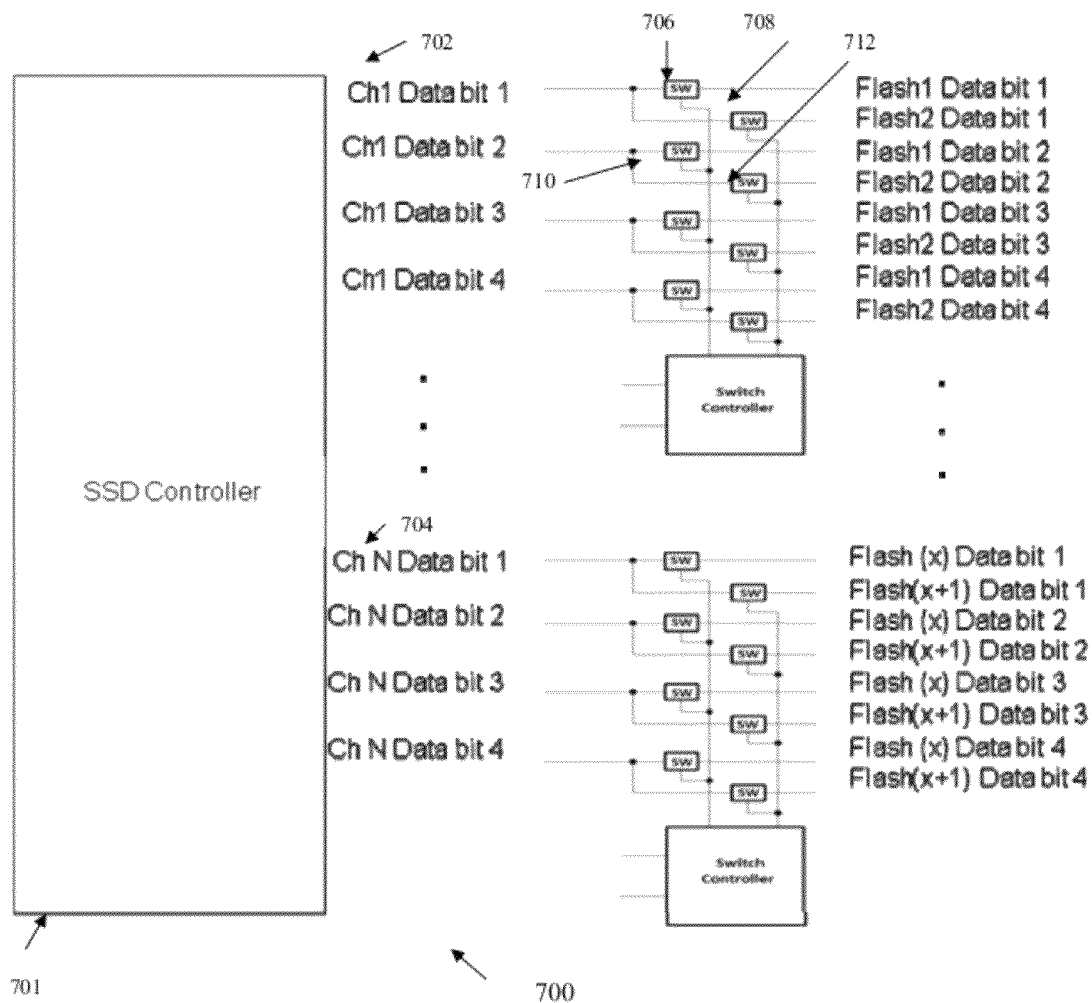
FIG. 7 depicts a functional diagram of a SSD with load isolation according to embodiments of the disclosed subject matter.

FIG. 7 depicts a functional diagram of a SSD device 700 with isolation according to embodiments of the disclosed subject matter. SSD device 700 includes a controller 701 having N number of channels, from channel 1 702 to channel N 704. Each channel 702, 704 is connected to two flash drives, flash 1 and flash 2 for channel 1 702 and flash x and flash x+1 for n channel 704. Each channel 702, 704 is electrically connected to two flash drives through an array of FET switches. Data bit 1 on channel 1 passes through either switch 706 to flash 1 or switch 708 to flash 2, depending on which flash is selected by the controller 701. Bit 2 passes through switch 710 to flash 1 or switch 712 to flash 2, and so on for the rest of bit lines 3 and 4 of channel 1 702 and the other bit lines of the other n channels.

In some embodiments, the isolation devices can be used in combination with multiple channels to increase the performance and capacity of the SSD. For example, to obtain a 16 flash memory device SSD, two channels from the SSD controller can each be connected to eight flash memory devices as shown in FIG. 5. Additionally, the isolation devices can be used within each flash memory device to isolate each particular die. Therefore, a high performing 16, 32, 64, 128, die single channel SSD device can be created.

Other than load isolation, there are additional advantages to using isolation devices for SSDs. These advantages include a reduction of power consumption of the entire system because a smaller load seen by the controller and flash devices. Smaller loads can be translated to a reduction in drive strength on both sides of the I/O.

In conventional SSD controllers, the loading issue can be addressed by adding channels or increasing the number of control pins on each physical channel. Isolation devices eliminate the need for adding extra channels and extra control pins, resulting in a smaller die size and less power consumption.

Those of skill in the art would appreciate that the various illustrations in the specification and drawings described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The terms "SSD", "SSD device", and "SSD drive" as used herein are meant to apply to various configurations of solid state drive devices equipped with SSD controllers and isolation devices in accordance with one or more of the various embodiments of the disclosed subject matter. It will be understood that other types of non-volatile mass storage devices in addition to flash memory devices may also be utilized for mass storage.

We claim:

1. A solid state device comprising:
an application specific integrated circuit (ASIC) controller having a port;
a plurality of flash memory devices, wherein each flash memory device is configured to be in electrical communication with the port associated with the ASIC controller; and
a plurality of isolation devices configured to electrically couple the port to one of the plurality of flash memory devices and to decouple the port from the rest of the plurality of flash memory devices.

2. The solid state device of claim 1, wherein the plurality of isolation devices are arranged in a tree topology.

3. The solid state device of claim 2, wherein the tree topology comprises a binary tree topology.

4. The solid state device of claim 1, wherein the ASIC controller is configured to send a control signal to the plurality of isolation devices to cause the plurality of isolation devices to couple the port to the one of the plurality of flash memory devices and to decouple the port from the rest of the plurality of flash memory devices.

5. The solid state device of claim 1, wherein at least one of the plurality of isolation devices comprises a multiplexor.

6. The solid state device of claim 1, wherein at least one of the plurality of isolation devices comprises a field effect transistor switch.

7. The solid state device of claim 1, wherein at least one of the plurality of isolation devices comprises an electrostatic discharge (ESD) protection circuit.

8. The solid state device of claim 1, wherein at least one of the plurality of isolation devices is configured to electrically decouple one or more of the plurality of flash memory devices from the ASIC controller in response to an exception condition.

9. The solid state device of claim 1, wherein at least one of the plurality of isolation devices is configured to receive a flash control data signal, a select command signal, and an output enable signal from the ASIC controller,
wherein the at least one of the plurality of isolation devices is configured to provide the flash control data signal and the select command signal to one of the plurality of flash memory devices when the output enable signal is in a first state, and
wherein the at least one of the plurality of isolation devices is configured to decouple the one of the plurality of flash memory devices from the ASIC controller when the output enable signal is in a second state.

10. The solid state device of claim 9, wherein the at least one of the plurality of isolation devices is configured to receive the flash control data signal at one of: a rate of about 400 MT/s, or at a rate between about 400 MT/s and about 1000 MT/s.

11. The solid state device of claim 9, wherein the controller is configured to provide the output enable signal in the second state in response to an exception condition.

12. The solid state device of claim 11, wherein the exception condition includes a power supply disruption.

13. A circuit system comprising:
a memory controller electrically coupled to a channel, wherein the memory controller is configured to select one of a plurality of flash memory devices and to provide a control signal in response to the selection, and wherein the channel is configured to accommodate a data signal at a rate greater or equal to about 400 million transfers per second (MT/s); and
a multiplexing circuit electrically coupled to the channel and to the plurality of flash memory devices, wherein the multiplexing circuit is configured to receive the control signal from the memory controller and, in response, to couple the channel to the selected one of the plurality of flash memory devices, and wherein the multiplexing circuit is further configured to decouple each of the plurality of flash memory devices from the memory controller in response to an exception condition.

14. The circuit system of claim 13, wherein the exception condition comprises a power supply disruption.

15. The circuit system of claim 13, wherein the controller is configured to indicate the exception condition to the multiplexing circuit by sending an output enable signal to the multiplexing circuit.

16. The circuit system of claim 13, wherein the multiplexing circuit comprises a plurality of isolation devices arranged in a tree topology, and wherein at least one of the plurality of isolation devices comprises an electrostatic discharge (ESD) protection circuit.

17. A method implemented in a solid state drive system comprising:

receiving a data control signal, a select command signal, and an output enable signal from a memory controller at an isolation device;

if the output enable signal is at a first enable state, sending the data control signal from the isolation device to a first memory device when the select command signal is in a first selection state;

sending the data control signal from the isolation device to a second memory device when the select command signal is in a second selection state; and if the output enable signal is at a second enable state, decoupling the first memory device and the second memory device from the memory controller.

18. The method of claim 17, wherein the output enable signal is received from the memory controller in response to a power supply disruption.

19. The method of claim 17, wherein receiving the data control signal from the memory controller at the isolation device includes receiving the data control signal at one of: a rate of about 400 MT/s, or at a rate between about 400 MT/s and about 1000 MT/s.

20. The method of claim 17, wherein decoupling the first memory device and the second memory device from the SSD controller includes decoupling the isolation device from a power supply.

* * * * *